(12) United States Patent
Shin

(10) Patent No.: US 7,865,198 B2
(45) Date of Patent: Jan. 4, 2011

(54) METHOD FOR MESSAGE EXCHANGING SERVICE BETWEEN RESIDENTIAL DEVICE AND MOBILE TERMINAL

(75) Inventor: Young-Sik Shin, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 557 days.

(21) Appl. No.: 11/629,881

(22) PCT Filed: Jun. 21, 2005

(86) PCT No.: PCT/KR2005/001912

§ 371 (c)(1),
(2), (4) Date: Dec. 18, 2006

(87) PCT Pub. No.: WO2005/125094

PCT Pub. Date: Dec. 29, 2005

(65) Prior Publication Data

US 2008/0051118 A1  Feb. 28, 2008

(30) Foreign Application Priority Data

Jun. 21, 2004  (KR) .................. 10-2004-0046241

(51) Int. Cl.
*H04W 4/00* (2009.01)
(52) U.S. Cl. .............. 455/466; 455/41.2; 455/352; 455/418; 370/338; 370/825.31
(58) Field of Classification Search ............... 455/466, 455/41.2, 352, 418–420, 426.1–426.2, 3.01, 455/403, 446, 422.1, 428, 445, 454, 554.1–555; 370/338, 328; 340/825.31, 825.34; 709/203–207; 725/166, 78
See application file for complete search history.

(56) References Cited

U.S. PATENT DOCUMENTS

| 6,393,297 | B1 * | 5/2002 | Song ........................... 455/466 |
| 6,714,222 | B1 * | 3/2004 | Bjorn et al. .................. 715/839 |
| 7,469,550 | B2 * | 12/2008 | Chapman et al. ............... 62/157 |
| 2002/0183081 | A1 | 12/2002 | Elizondo |
| 2003/0078032 | A1 * | 4/2003 | Pei et al. ...................... 455/411 |
| 2003/0154257 | A1 * | 8/2003 | Hantsch et al. ............. 709/207 |
| 2003/0226143 | A1 * | 12/2003 | Michael et al. ............... 725/32 |
| 2004/0203950 | A1 * | 10/2004 | Chen ........................... 455/466 |
| 2004/0266412 | A1 * | 12/2004 | Maes et al. ............. 455/414.4 |
| 2005/0176449 | A1 * | 8/2005 | Cui et al. ..................... 455/466 |
| 2005/0186974 | A1 * | 8/2005 | Cai ............................. 455/466 |

FOREIGN PATENT DOCUMENTS

| KR | 2000/0003807 | 1/2000 |
| KR | 2003/0067286 | 8/2003 |
| WO | WO 02/065795 | 8/2002 |
| WO | WO 02/091764 | 11/2002 |

\* cited by examiner

*Primary Examiner*—Kamran Afshar
*Assistant Examiner*—Marisol Fahnert
(74) *Attorney, Agent, or Firm*—Lowe Hauptman Ham & Berner LLP

(57) ABSTRACT

The disclosure relates to a method for a message exchange service, especially to a service method for transmitting/receiving an SMS (Short Message Service) or MMS (Multimedia Message Service) information from a mobile terminal to a residential device, or from a residential device to a mobile terminal, characterized by including a mobile terminal; Internet; a home network serving node (HNSN) system; an SMS server; and an indoor residential gateway (RG) having a plurality of residential devices.

10 Claims, 3 Drawing Sheets

METHOD FOR MESSAGE EXCHANGING SERVICE BETWEEN RESIDENTIAL DEVICE AND MOBILE TERMINAL

CROSS REFERENCE TO RELATED APPLICATION

This application is the National Phase application of International Application No. PCT/KR2005/001912, filed Jun. 21, 2005, which designates the United States and was published in English. This application, in its entirety, is incorporated herein by reference.

TECHNICAL FIELD

The present invention relates to a method for a message exchange service, in more detail to a service method for transmitting/receiving SMS (Short Message Service) or MMS (Multimedia Message Service) information from a (user) mobile terminal (or station) to a residential (indoor) device, or from a residential device to a mobile terminal.

On the whole, a network includes communication links, and various equipments connected to the above communication links and having communication capabilities. The above equipments include a personal computer, a peripheral, a router, a storage media, and an electrical appliance having a communication interface with a processor. An embodiment of the above network can be a home network (used at a home) which various equipments are interconnected to.

An ordinary home can have a personal computer and various equipments including equipments used at home, which can be typically seen at home. The term, 'equipment' includes typically logical equipments or other equipments which were functional and capable of exchanging data, and can also include general purpose computers as well as all equipments used at home.

The above equipments used at home include a surveillance system, facilities for a movie theater, a TV, a VCR, stereo facilities, and electronic equipments such as a system for DBSS (Direct Broadcast Satellite Services) known as DSS (Digital Satellite Services), a spring cooler system, a lighting system, a microwave, a tableware washing device, an oven/stove, an electric washing machine/a drying machine, and a processing system in an automobile.

These equipments used at home are used for performing the tasks improving a life style and a living standard of an (house) owner. For example, a tableware washing device performs the task for washing dirty tablewares, and mitigates the efforts that the owners have to wash their own tablewares by themselves. A VCR makes the owner watch a specific program later by making a record of a TV program. A surveillance system can protect precious things of the owner, and diminish the fear of the owner for unwanted intrusions.

Meanwhile, if these home network equipments used at home and the item capable of transmitting/receiving message information between external mobile terminals can be merged, the information exchange between each residential device and an external mobile terminal can be smoothly accomplished.

That is, while a system and a service which can transmit/receive an SMS message or an MMS message between mobile terminals are being provided at present, it is expected that the revitalization of a home network system might be contributed by adapting the additional functions described in the above to the home network system.

BACKGROUND ART

A network includes communication links, and various equipments connected to the above communication links and having communication capabilities. The above equipments include a personal computer, a peripheral, a router, a storage media, and an electrical appliance having a communication interface with a processor. An embodiment of the above network can be a home network (used at a home) which various equipments are interconnected to.

An ordinary home can have a personal computer and various equipments including equipments used at home, which can be typically seen at home.

These equipments used at home are used for performing the tasks improving a life style and a living standard of an owner. For example, a tableware washing device performs the task for washing dirty tablewares, and mitigates the efforts that the owners have to wash their own tablewares by themselves. A VCR makes the owner watch a specific program later by making a record of a TV program. A surveillance system can protect precious things of the owner, and diminish the fear of the owner for unwanted intrusions.

Meanwhile, if these home network equipments used at home and the item capable of transmitting/receiving message information between external mobile terminals can be merged, the information exchange between each residential device and an external mobile terminal can be smoothly accomplished.

DISCLOSURE OF INVENTION

Technical Problem

An ordinary home can have a personal computer and various equipments including equipments used at home. The above equipments used at home include a surveillance system, facilities for a movie theater, a TV, a VCR, stereo facilities, and electronic equipments such as a system for DBSS (Direct Broadcast Satellite Services) known as DSS (Digital Satellite Services), a spring cooler system, a lighting system, a microwave, a tableware washing device, an oven/stove, an electric washing machine/a drying machine, and a processing system in an automobile.

If these home network equipments used at home and the item capable of transmitting/receiving message information between external mobile terminals can be merged, the information exchange between each residential device and an external mobile terminal can be smoothly accomplished.

While a system and a service which can transmit/receive an SMS message or an MMS message between mobile terminals are being provided at present, the additional functions described in the above have not adapted yet to the home network system.

Technical Solution

The present invention is for solving the above problems, and the objectives of the present invention are to provide the method exchanging the message information such as an SMS message or an MMS message from a mobile terminal to a residential device or from a residential device to a mobile terminal.

As the subject-matter for achieving the objectives described in the above, the present invention provides a message exchange service between a mobile terminal and a residential device under the basis of home network system, including a mobile terminal; Internet; a home network serving node (HNSN) system; an SMS server; and an indoor residential gateway (RG) having a plurality of residential devices, characterized in that a mobile terminal sends a message to a residential device by including the step for interconnecting to an HNSN system through Internet by executing a client program of a mobile terminal;

the step for preparing an SMS message after selecting an arbitrary residential device for sending said message;

the step for catching the device location of said indoor RG being equipped inside the home of a subscriber in the case that said mobile terminal sends said prepared message;

the step for catching whether the device selected by said mobile terminal among said residential devices is available;

the step, according to the result of the previous step, for delivering said message to said indoor RG in the case that said device selected by said mobile terminal is available; and the step that said indoor RG which receives said message delivers said message to the corresponding residential device, makes said message displayed.

ADVANTAGEOUS EFFECTS

As described in the above, the present invention can easily exchange (i.e., transmit and receive) the message information like an SMS message or an MMS message from a mobile terminal (mobile phone) to a residential device or from a residential device to a mobile terminal.

Thus, applying the above additional functions for transmitting/receiving message to/from a home network system can contribute to the activation of the home network system.

DESCRIPTION OF THE NUMERALS ON THE MAIN PARTS OF THE DRAWINGS

10: mobile terminal (or station)
20: base transceiver station
30: Internet
40: HNSN (Home Network Serving Node)
41: application server
42: Hnsn UPnP
43: User/Device Information DB
44: HnsnRg IF
50: SMS server
60: RG (residential gateway)
70: Device (residential indoor device)
S11: Connect to an HNSN system using a mobile terminal
S12: Select a device for message transmission and prepare a message
S13: Message transmission
S14: Is it possible to use the device selected by a user?
S15: Transmit the message to the corresponding device
S16: Display the message
S21: Prepare a message using the device
S22: Transmit the message to an HNSN system
S23: Transmit an MIN number to an SMS server for the corresponding message
S24: Transmit the message to the user mobile terminal

MODE FOR THE INVENTION

Hereinafter, referring to appended drawings, the structures and operational principles for the embodiments of present invention are described in detail.

Figure 1:
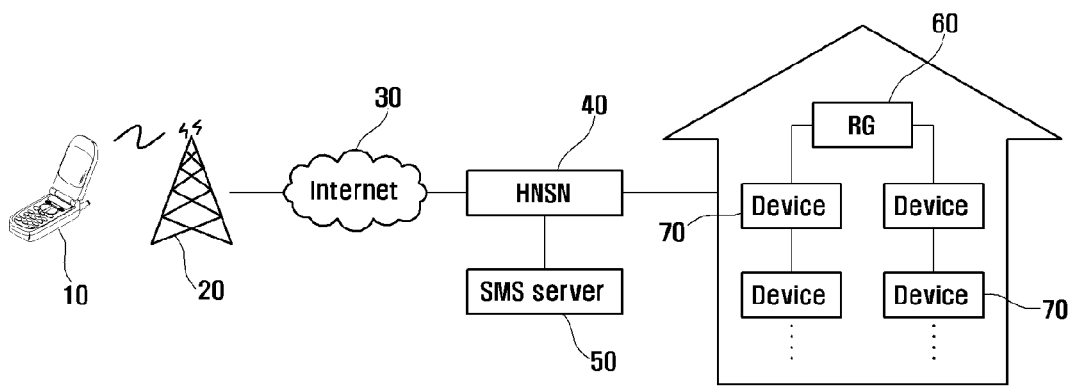
FIG. 1 is a structural drawing of the system for a message exchange service between a residential device and a mobile terminal in accordance with the present invention.
Figure 2:
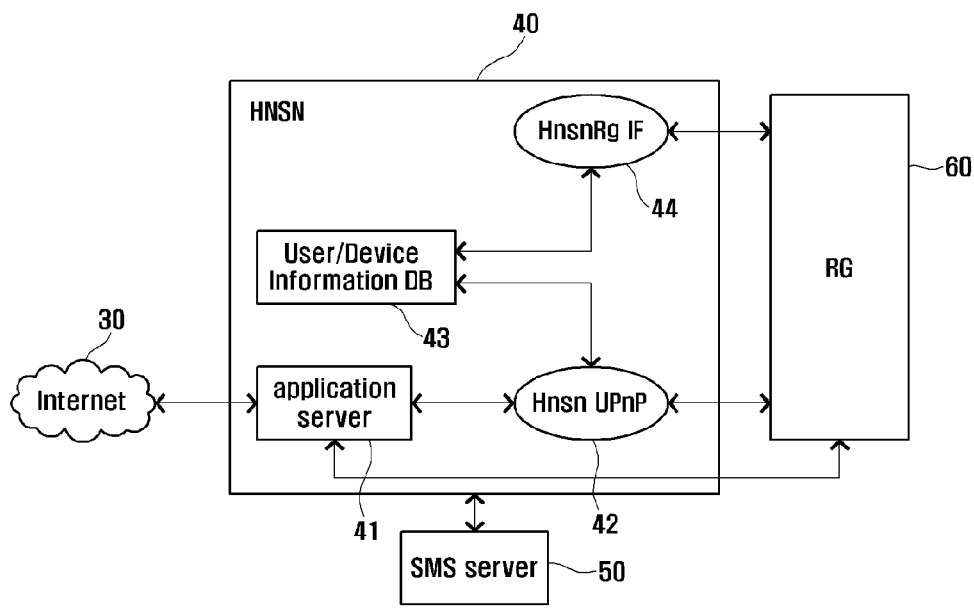
FIG. 2 is a detailed structural drawing of a home network service system cooperated with an indoor residential gateway (RG) in accordance with the present invention.

FIG. 1 is a structural drawing of the system for a message exchange service between a residential device and a mobile terminal in accordance with the present invention. FIG. 2 is a detailed structural drawing of a home network service system cooperated with an indoor residential gateway (RG) in accordance with the present invention.

As referring to FIG. 1, the system for a message exchange service comprises a mobile terminal (10); a base transceiver station (20); Internet (30); an HNSN (home network serving node) system (40); an SMS (short message service) server (50); and an RG (residential gateway) (60) having a plurality of devices (70).

The above mobile terminal (10) means a mobile station including a PCS (personal communication service) phone, a cellular phone, a CDMA (code division multiple access) 2000 terminal, an IMT-2000 (international mobile telecommunication-2000) terminal, and a WCDMA (wide-band CDMA) terminal.

The above BTS (base transceiver station) (20) enables each user to use wireless communication with a mobile terminal (10), and plays roles of transmitting/receiving the signal to/from a BSC (base station controller) which is located at transmission path and connected to a BTS.

The above Internet (30) provides a communication network for wireless internet connection between a mobile terminal (10) and an HNSN (40).

The above HNSN (40) has an application server processing the request of a mobile terminal (10) by cooperating with an SMS server (50) and an indoor RG (60), and plays a role of the relay for providing a home network service.

The above SMS server (50) is cooperated with an HNSN (40), and plays a role of the relay for providing SMS or MMS information between a mobile terminal (10) and an residential device (70).

The above RG (60) has a plurality of devices (70) such as a TV used at home, a personal computer (PC), a PDA (personal digital assistant), a STB (Set-Top Box), a refrigerator.

As referring to FIG. 2, the detailed structures and operations of an HNSN system cooperated with an indoor residential gateway (RG) are as follows.

The above HNSN system comprises an application server (41) cooperated with Internet (30) and an SMS server (50), which have WEB/WAP (wireless application protocol) and a VM (virtual machine); an HnsnUPnP (42) playing a role of the home network middleware; a user/device information DB (43); and an HnsnRgIF (44) paying a role of the home network interface. Wherein, the above an HnsnUPnP (42) and an HnsnRgIF (44) are cooperated with an RG (60).

The above application server (41) processes the requests from each mobile terminals, performs the operations to translate the response incoming from an HnsnUPnP (42) into the appropriate formats for the mobile terminal.

At this time, each mobile terminal connects to a WEB server in an HNSN (40), and a user application server (41) analyzes the requests of each mobile terminal using XML (eXtensible Markup Language) and delivers them to an Hnsn- UPnp (42). Also, a user application server (41) translates the responses incoming from an HnsnUPnP (42) to the appropriate formats for each mobile terminal, and delivers them to each mobile terminal.

The above HnsnRgIF (44) is a process playing roles of RG registration, authentication, and connection management, and communicates with an RG (50) on TCP (Transaction Control Protocol)/IP (Internet Protocol) using SOAP (Simple Object Access Protocol). Moreover, the above HnsnRgIF (44) is the process running as a daemon, receives the requests from an RG (60), and processes them.

Here, SOAP is a simple object access protocol, which is used in XML. Whatever the platforms are, SOAP, a protocol for connecting different servers and services can make access to corresponding server and service using XML and HTTP.

The above HnsnUPnP (42) is the process performing the commands for device controls and event controls from user application server (41). It is the process running as a daemon, which gets the requests from a user application server (41) or an RG (60) and then processes them.

Moreover, a user application server (41) brings the device and service description files from an RG (60) and stores, and then uses for device controls.

At this time, each process in the above performs XML data parsing for request and response messages, and refers or changes the database with respect to users and devices.

Figure 3:
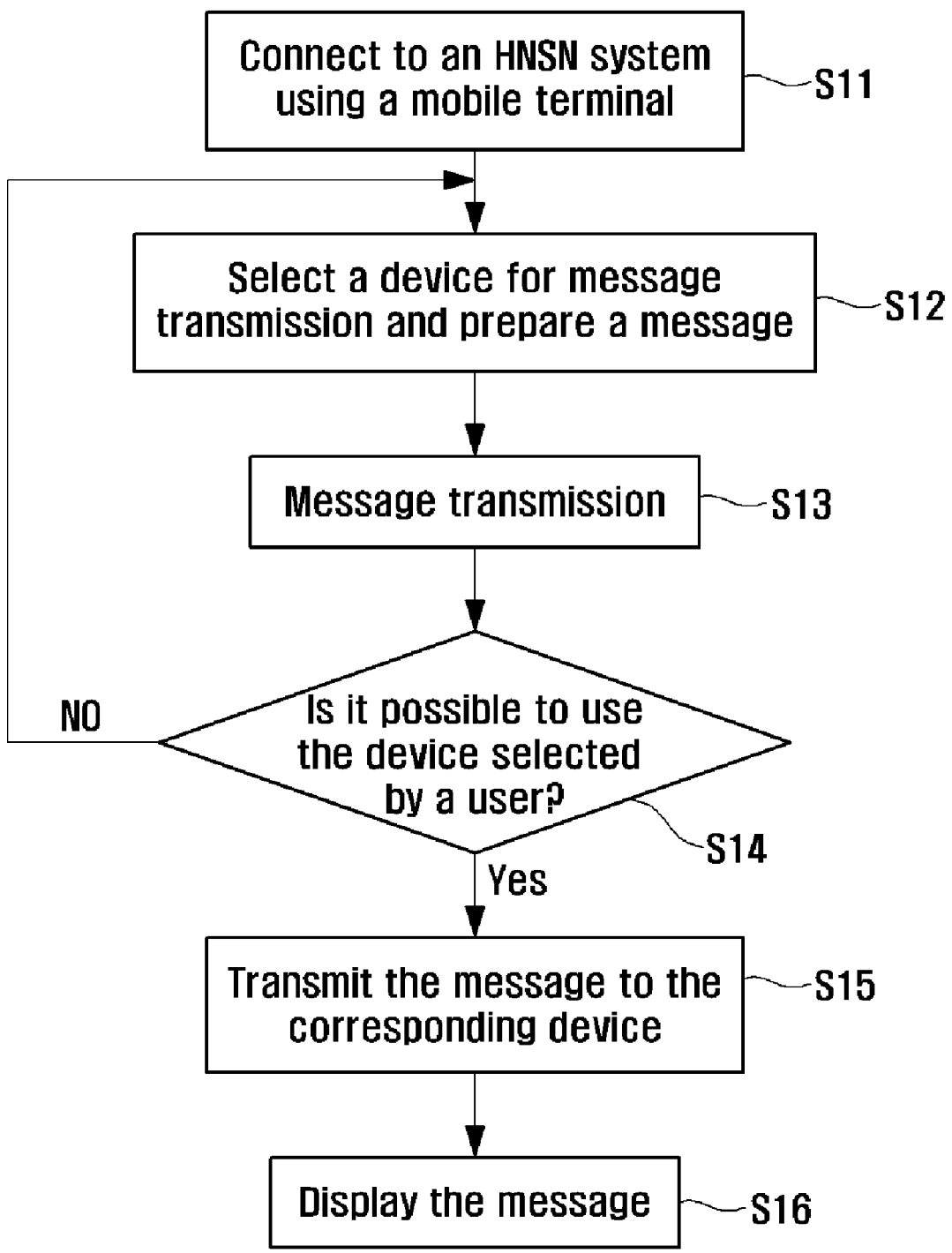
FIG. 3 is a flow diagram showing the message transmission process from a mobile terminal to a residential device in accordance with an embodiment of the present invention.

FIG. 3 is a flow diagram showing the message transmission process from a mobile terminal to a residential device in accordance with an embodiment of the present invention.

At first, a mobile terminal (10) executes a client program and connects to an HNSN (40) through Internet (30), and then enters user ID and password using key pad of a mobile terminal (10) (S11).

Then, after selecting a residential device (70) (for example, a TV) for transmitting a message, an SMS message or an MMS message is prepared (S12).

In the case of transmitting the message prepared in the above mobile terminal (10), an HNSN (40) receives the transmitted message through an SMS server (50), and catches the location for a device (70) of an RG (60) installed at the subscriber's home (S13).

Then, the catch for whether, among residential devices (70), the device selected by a user can be utilized is performed (S14).

As a result of the above decision, if it is impossible to use the device (70) selected by a user, the message is stored and the message is transmitted when it is possible to use the device. If it is possible to use the device (70) selected by a user, the above HNSN (40) delivers the message to an indoor RG (60) (S15).

Then, the RG (60) receiving the above message delivers the message to STB in the case that the device to display the message is a TV. At this time, the above STB can display the message because the client program capable of displaying the message on the screen is embedded in the STB.

Moreover, in the case that the above device (70) is a PC, or a PDA, the message is delivered to a PC or a PDA, the PC or PDA receiving the message displays the message. It is also possible to display the message, because client program is embedded in the PC and PDA (S16).

Figure 4:
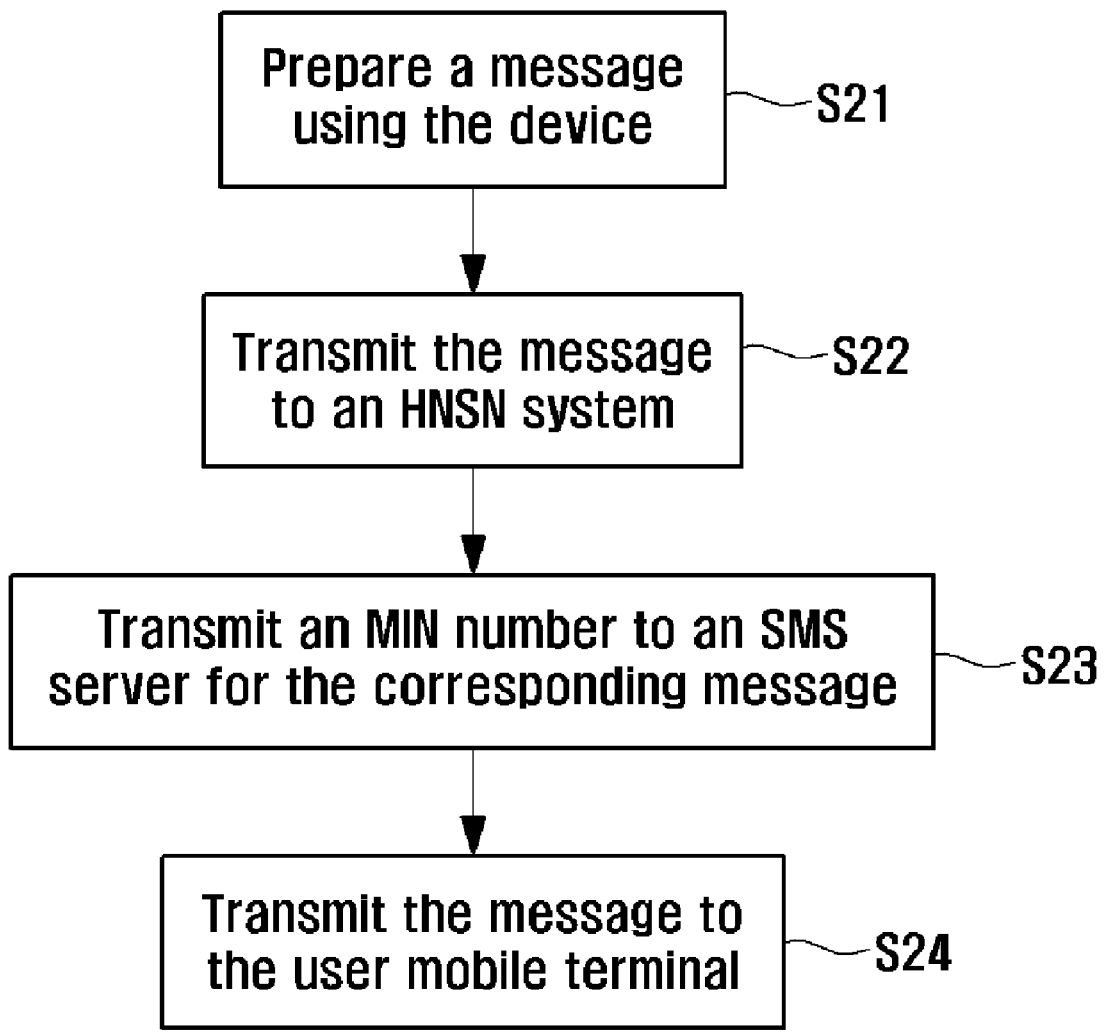
FIG. 4 is a flow diagram showing the message transmission process from a residential device to a mobile terminal in accordance with an embodiment of the present invention.

FIG. 4 is a flow diagram showing the message transmission process from a residential device to a mobile terminal in accordance with an embodiment of the present invention.

At first, an SMS or an MMS message is prepared through UI (user interface) of a PC, a PDA, or a TV in residential devices (70) (S21).

At this time, the phone number of a receiving mobile terminal (10) is written when the above message is prepared. With a view to doing the above step, the client program capable of preparing the message is embedded in each device (70). As the case might be, the client program can be set in order that the phone number of a mobile terminal is written simultaneously.

Under this situation, the above prepared message is sent to an RG (60), and the RG (60) transmits the received message to an HNSN (40) (S22).

At this time, the above HNSN (40) delivers the message content and the identification number (MIN) of the mobile terminal (10) which will receive the message, to an SMS server (50) (S23).

The above SMS server (50) delivers an SMS message or an MMS message to the corresponding mobile terminal (10) through Internet (30) based on the identification number (MIN) of a receiving mobile terminal (10) (S24).

Since those having ordinary knowledge and skill in the art of the present invention will recognize additional modifications and applications within the scope thereof, the present invention is not limited to the embodiments and drawings described above.

INDUSTRIAL APPLICABILITY

Recently, with a wide spread of Internet and advances in communication technologies, attention is paid to the area related to a method for transmitting/receiving SMS (Short Message Service) or MMS (Multimedia Message Service) information from a mobile terminal (or station) to a residential device, or from a residential device to a mobile terminal.

An ordinary home can have a personal computer and various equipments including equipments used at home. The above equipments used at home include a surveillance system, facilities for a movie theater, a TV, a VCR, stereo facilities, and electronic equipments such as a system for DBSS (Direct Broadcast Satellite Services) known as DSS (Digital Satellite Services), a spring cooler system, a lighting system, a microwave, a tableware washing device, an oven/stove, an electric washing machine/a drying machine, and a processing system in an automobile.

If these home network equipments used at home and the item capable of transmitting/receiving message information between external mobile terminals can be merged, the information exchange between each residential device and an external mobile terminal can be smoothly accomplished.

Thus, it is expected that the revitalization of a home network system might be contributed by adapting the additional functions described in the above to the home network system.

The invention claimed is:

1. A method for a message exchange service between a mobile terminal and at least one residential device located in a home of a subscriber by way of a home network system, said home network system including:
    a home network serving node (HNSN) system located outside the home, and communicable with the mobile terminal over the Internet;
    an SMS (Short Message Service) server communicable with the HNSN system; and
    an indoor residential gateway (RG) located inside the home and connected to a plurality of residential devices including the at least one residential device;
said method comprising: transmitting a message from the mobile terminal to the at least one residential device by:

connecting the mobile terminal to said HNSN system through the Internet by executing a client program in said mobile terminal and entering a user ID and a password;

after said connecting and entering, selecting the at least one residential device, among the residential devices in said home, as a destination for said message;

after said selecting, preparing said message;

determining a location of said indoor RG when said prepared message is sent by said mobile terminal via the SMS server;

determining whether the at least one residential device selected by said mobile terminal among said residential devices is available;

delivering said message to said indoor RG in accordance with the determined location of the said indoor RG when it is determined that said at least one residential device selected by said mobile terminal is available; and upon receipt of said message, said indoor RG delivering said message to the at least one residential device, and causing said message to be displayed by said at least one residential device.

2. The method of claim 1, further comprising a message transmission from said at least one residential device to said mobile terminal by:

preparing an SMS message through an UI (user interface) in said at least one residential device;

transmitting said SMS message to said HNSN system via the indoor RG;

upon receipt of said SMS message, said HNSN system delivering said message and an identification number (MIN) of said mobile terminal to said SMS server; and said SMS server transmitting said SMS message to the mobile terminal having the received identification number (MIN).

3. The method of claim 1, wherein said residential devices in the home comprise one or more selected from the group consisting of a TV (television), a PC (personal computer), a PDA (personal digital assistant), a STB (Set-Top Box), and a refrigerator.

4. The method of claim 1, wherein said message sent from the mobile terminal to the at least one residential device is an MMS (multimedia message service) message.

5. The method of claim 2, wherein said residential devices in the home comprise one or more selected from the group consisting of a TV (television), a PC (personal computer), a PDA (personal digital assistant), a STB (Set-Top Box), and a refrigerator.

6. The method of claim 3, wherein
said at least one residential device which is the destination for the message is the TV; and
upon receipt of said message, said indoor RG delivers said message to the STB connected to the TV and the STB causes said message to be displayed on the TV.

7. The method of claim 2, further comprising:
embedding a client program in each of said residential devices in the home to enable preparation of SMS messages at each said residential device via the UI of each said residential device and by way of the client program embedded in each said residential device.

8. The method of claim 7, wherein said residential devices in the home comprise one or more selected from the group consisting of a TV (television), a STB (Set-Top Box), and a refrigerator.

9. The method of claim 1, wherein
the mobile terminal is connected to the HNSN system and selects the at least one residential device before preparing the message and sending the prepared message to the SMS server.

10. The method of claim 9, further comprising
maintaining at said HNSN system a user/device information database.

* * * * *